C. W. SCHULTZE.
FILTERING APPARATUS.
APPLICATION FILED OCT. 1, 1908.
938,279.
Patented Oct. 26, 1909.
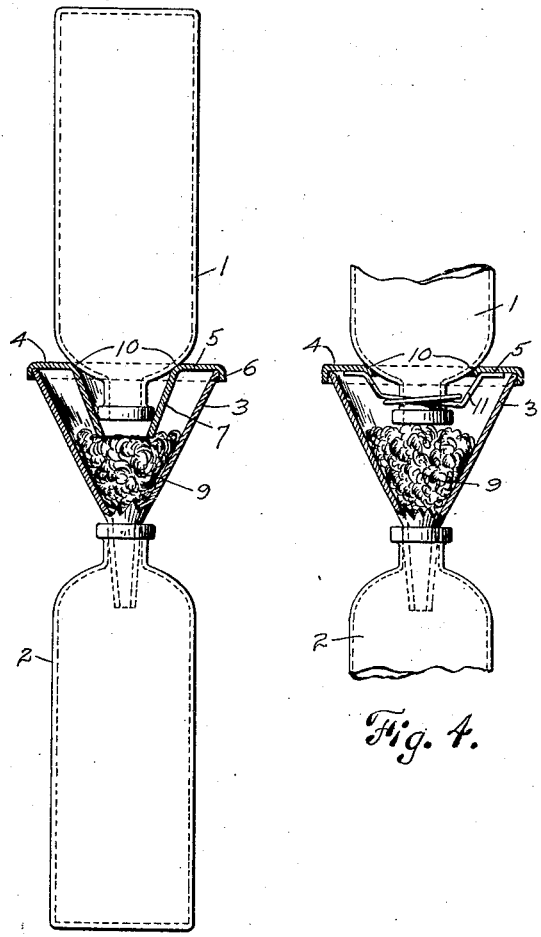
Fig. 1.
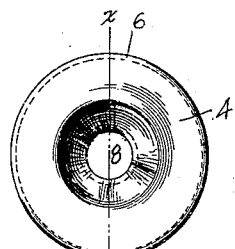
Fig. 2.
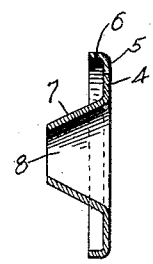
Fig. 3.
Fig. 4.
WITNESSES:
Chas. W. Stauffiger
Ethel A. Kelly
INVENTOR
Carl W. Schultze
BY J. W. Ellis
ATTORNEY

UNITED STATES PATENT OFFICE.

CARL W. SCHULTZE, OF BUFFALO, NEW YORK, ASSIGNOR TO THE CLARINE COMPANY, OF BUFFALO, NEW YORK, A CORPORATION OF NEW YORK.

FILTERING APPARATUS.

938,279.  Specification of Letters Patent.  Patented Oct. 26, 1909.

Application filed October 1, 1908. Serial No. 455,642.

*To all whom it may concern:*

Be it known that I, CARL W. SCHULTZE, a citizen of the United States of America, and a resident of Buffalo, in the county of Erie and State of New York, have invented a certain new and useful Filtering Apparatus, of which the following is a full, clear, and exact description.

My invention relates generally to filtering apparatus having filter covers and supply feeders when used for filtration purposes.

More particularly it relates to means for supporting over a receiving receptacle having a filter-funnel, an inverted open-necked receptacle containing the liquid to be filtered so that a constant level of the liquid will be automatically maintained within the filter funnel and at the same time the volatilization of volatile liquids will be substantially prevented and the filtering apparatus will be practically dust-proof.

My invention is particularly adapted for use in filtering water when a compound is used for coagulating the impurities in the water. In such case the bottle or other suitable receptacle having an open neck and containing the impure water is first treated with a compound. An empty bottle or other suitable receptacle is then fitted with a funnel containing a filtering medium and my filter cover is placed over the funnel. The first-named receptacle is then inverted and placed upon the cover with its open neck located within the filter cover so that the impure water will flow from it through the filtering medium and thence into the empty receiving receptacle. In this way filtration of liquids may be accomplished without the necessity of any manual attention after the process has begun.

Referring to the accompanying drawings: Figure 1 is an elevation, partly in section, of my invention in use. Fig. 2 is a top plan view of the filter cover. Fig. 3 is a section on the line $x$—$x$ of Fig. 2. Fig. 4 is a view of a modified form of my invention.

For clearness I will herein describe my invention as applied to the filtration of impure water from one vessel to another, but it will be evident that it may be used whenever and wherever it is desired to transfer for any purpose a liquid contained in an inverted open-necked vessel, from that vessel into a receiving vessel placed or held in a stable position.

For convenience I will call the inverted receptacle 1, the mixing receptacle, and the lower receptacle 2, the receiving receptacle. A filter funnel 3 is inserted into the neck of the receiving receptacle sufficiently far so that it is firmly held in place therein. The filter cover 4 is formed with an upper supporting surface 5 (preferably flat) having a central opening and a depending outside peripheral flange 6 which is adapted to receive and fit over the upper flaring rim of the filter funnel 3. The filter cover 4 is further provided with a central depending support or cone frustum 7 having a suitable opening 8 receiving the open neck of the mixing receptacle and through which the liquid may pass. Clearly the mixing receptacle should have no other opening than that at its outlet or mouth; otherwise air would enter behind the out-flowing liquid and cause the filter funnel to overflow.

In the modified form of my invention shown in Fig. 4, the depending central support 11 is made of wire suitably secured to the upper supporting surface 5 of the filter cover and this construction will attain most of the advantages attainable by means of that shown in the other figures. Although I have shown the upper part of my filter cover as made of sheet metal, clearly it could be made of wire having the same general conformation as the sheet metal cover but of course it would not serve the purpose of preventing the dust from reaching the filtering liquid, nor would it prevent the volatilization of volatile liquids as is the case when the sheet metal construction shown and described is used. For filtering purposes there may be placed within the filter funnel 3 a wad of cotton 9 or any other suitable filtering medium designed to catch or arrest the impurities of the liquid as it passes through it.

In the operation my invention may be employed as follows: The mixing receptacle 1 is first filled with impure water and treated with a compound that will coagulate or enmesh the impurities in it. Into the neck of the empty receiving receptacle 2 is placed the filter funnel 3 and a suitable quantity of cotton 9 is placed in the lower part of the funnel. The holder 4 is then set over the funnel so that its depending outside periphery flange 6 will fit over the upper rim of the filter funnel. The mixing receptacle is then inverted so that its neck seats into the depending tapering support or cone frustum 7 and its shoulders 10 rest against the shoulders of the upper surface 5 of the holder 4. When the parts have been assembled in the manner described and clearly shown in Fig. 1 the water will pass from the mixing receptacle 2 into the filter funnel 3 through the cotton 9 into the receiving receptacle 2. Thus the coagulated and enmeshed impurities of the water will be caught in the cotton and no matter how long the process may take the two receptacles will remain in stable equilibrium and require no manual attention.

From the foregoing description it will be seen that I have provided a convenient and easily operated means for filtering liquids from one vessel into another the several parts of which are readily assembled and kept clean.

It will be evident that a skilled mechanic may change the form and proportion of parts of my invention without departing from its spirit or sacrificing its advantages.

What I claim is:

1. As an article of manufacture, a filter cover and supply feeder, provided with an upper supporting surface having a central opening; an exterior depending peripheral flange and a central depending hollow support adapted to hold in a stable vertical position an inverted open-necked receptacle having a single opening.

2. As an article of manufacture, a filter cover and supply feeder provided with an upper supporting surface having a central opening; an exterior depending peripheral flange and a central depending hollow cone frustum.

3. As an article of manufacture a filter cover and supply feeder provided with an upper supporting surface having a central opening; and exterior depending peripheral flange and a central depending support adapted to hold in a stable vertical position an inverted open necked receptacle having a single opening.

4. The combination with an open necked receiving receptacle, an open-necked mixing receptacle and a filter funnel set within the neck of said receiving receptacle; of a filter cover and supply feeder provided with an upper supporting surface having a central opening; an exterior depending peripheral flange extending downwardly outside of the edge of said filter funnel and a central depending hollow support extending downwardly into the interior of said filter funnel, whereby said receiving receptacle is held in a stable inverted position over said mixing receptacle by means of its open neck and the contents of said mixing receptacle are thereby filtered into said receiving receptacle.

In testimony whereof I have hereunto set my hand in the presence of two witnesses.

CARL W. SCHULTZE.

Witnesses:
ETHEL A. KELLY,
J. WM. ELLIS.

Corrections in Letters Patent No. 938,279.

It is hereby certified that in Letters Patent No. 938,279, granted October 26, 1909, upon the application of Carl W. Schultze, of Buffalo, New York, for an improvement in "Filtering Apparatus," errors appear in the printed specification requiring correction as follows: Page 2, line 42, the word "and" should read *an;* same page, line 58, the word "receiving" should read *mixing,* and line 59, the word "mixing" should read *receiving;* and that the proper corrections have been made in the files and records of the Patent Office and are hereby made in said Letters Patent.

Signed and sealed this 10th day of May, A. D., 1910.

[SEAL.]

C. C. BILLINGS,

*Acting Commissioner of Patents.*